US007457681B2

(12) United States Patent
Krishna et al.

(10) Patent No.: US 7,457,681 B2
(45) Date of Patent: Nov. 25, 2008

(54) AUTOMATED, MODULAR APPROACH TO ASSIGNING SEMICONDUCTOR LOTS TO TOOLS

(75) Inventors: Murali Krishna, Chandler, AZ (US); Yi Deng, Portland, OR (US); Aishwarya Varadhan, Portland, OR (US); Joseph J. Concelman, Woodland Park, CO (US); Zachary T. Henkel, Gilbert, AZ (US); Robert A. Madson, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/395,661

(22) Filed: Mar. 31, 2006

(65) Prior Publication Data

US 2007/0233301 A1    Oct. 4, 2007

(51) Int. Cl.
G06F 19/00 (2006.01)
(52) U.S. Cl. .......................... 700/121; 700/97
(58) Field of Classification Search ........... 700/97–102, 700/217, 115–116, 121, 295; 705/1, 7–9
See application file for complete search history.

(56) References Cited

U.S. PATENT DOCUMENTS

| 6,470,231 | B1* | 10/2002 | Yang et al. ................... 700/121 |
| 6,584,371 | B1* | 6/2003 | Sada et al. ................... 700/116 |
| 6,604,012 | B1* | 8/2003 | Cho et al. ................... 700/121 |
| 2002/0107599 | A1* | 8/2002 | Patel et al. ................... 700/99 |
| 2006/0149404 | A1* | 7/2006 | Denton et al. ................... 700/99 |
| 2006/0195209 | A1* | 8/2006 | Tseng et al. ................... 700/99 |
| 2006/0293780 | A1* | 12/2006 | Chang et al. ................... 700/121 |

OTHER PUBLICATIONS

Pierce et al.; Value-Based Dispatching for Semiconductor Wafer Fabricatio, 2000 IEEE/SEMI advanced Semiconductor Manufacturing Conference, pp. 245-249.*
Krishna et al., A Progerssive Strategy to Achieving Automated Lot Processing, 2005 IEEE/SEMI Advanced Semiconductor Manufacturing Conference, pp. 1-5.*
Shen et al., An Automatic monitor Management System For Effective 300mm Fab Operations, 2001 IEEE, pp. 99-102.*

* cited by examiner

*Primary Examiner*—Kidest Bahta
(74) *Attorney, Agent, or Firm*—Trop, Pruner & Hu, P.C.

(57) ABSTRACT

The operation of a semiconductor fabrication facility may be automated to enable efficient assignments of lots to specific process tools or entities. This may involve the use of an algorithm which may have aspects which are common across various process areas within the fabrication facility. However, the algorithm may be customized to meet the needs of specific process areas.

24 Claims, 2 Drawing Sheets

AUTOMATED, MODULAR APPROACH TO ASSIGNING SEMICONDUCTOR LOTS TO TOOLS

BACKGROUND

This invention relates generally to the automation of semiconductor fabrication operations.

A semiconductor fabrication facility generally includes a large number of different process areas. Each process area may include a specific tool type that is responsible for a particular operation. There may be multiple tool instances of a given tool type. Examples of such process areas include implantation, deposition, etching, metallization, etc.

Wafer lots to be processed pass through the various process areas on their way to becoming completed semiconductor integrated circuit wafers. Thus, a number of steps are done in various process areas, but some alteration of the order of the steps may be possible. In addition, a number of different tools in any process area may be selected to run any particular lot. A lot is a collection of wafers that are grouped together for processing and transport. In other words, any specific process area may have more than one tool that may be capable of performing an operation that a given lot needs.

Generally, the assignment of lots to tools begins with a human operator who manages a given entity cluster. An entity is a semiconductor metrology tool capable of processing a lot. A cluster is a collection of like entities. The operator may notice that lots have arrived or that entities are waiting for lots. The operator may then use heuristics to assign lots to entities. The operator may also use his or her experience to select entities to run lots.

A state-independent constraint is one that is independent of the state of a tool, depending only on the configuration of the tool. The state is a set of variables that define a system such that, knowing the value of the state variables at time zero, one knowing the inputs or system changes can compute the state of the system at a later time. Conversely, a state-dependent constraint is one that depends on what the current state of the tool is, such as what types of lots are running on the tool or how the tool is currently operating.

The operator applies any available constraints, including state-independent and state-dependent constraints, to the lot entity assignments. If any of the constraints are violated, an error may be returned to the human operator. If not, the generated assignments are used to process the lots on entities either manually or automatically.

Ultimately, current management techniques for semiconductor fabrication facilities make relatively limited judgments about optimization, resulting in, to some degree, longer processing times.

DETAILED DESCRIPTION

Figure 1:
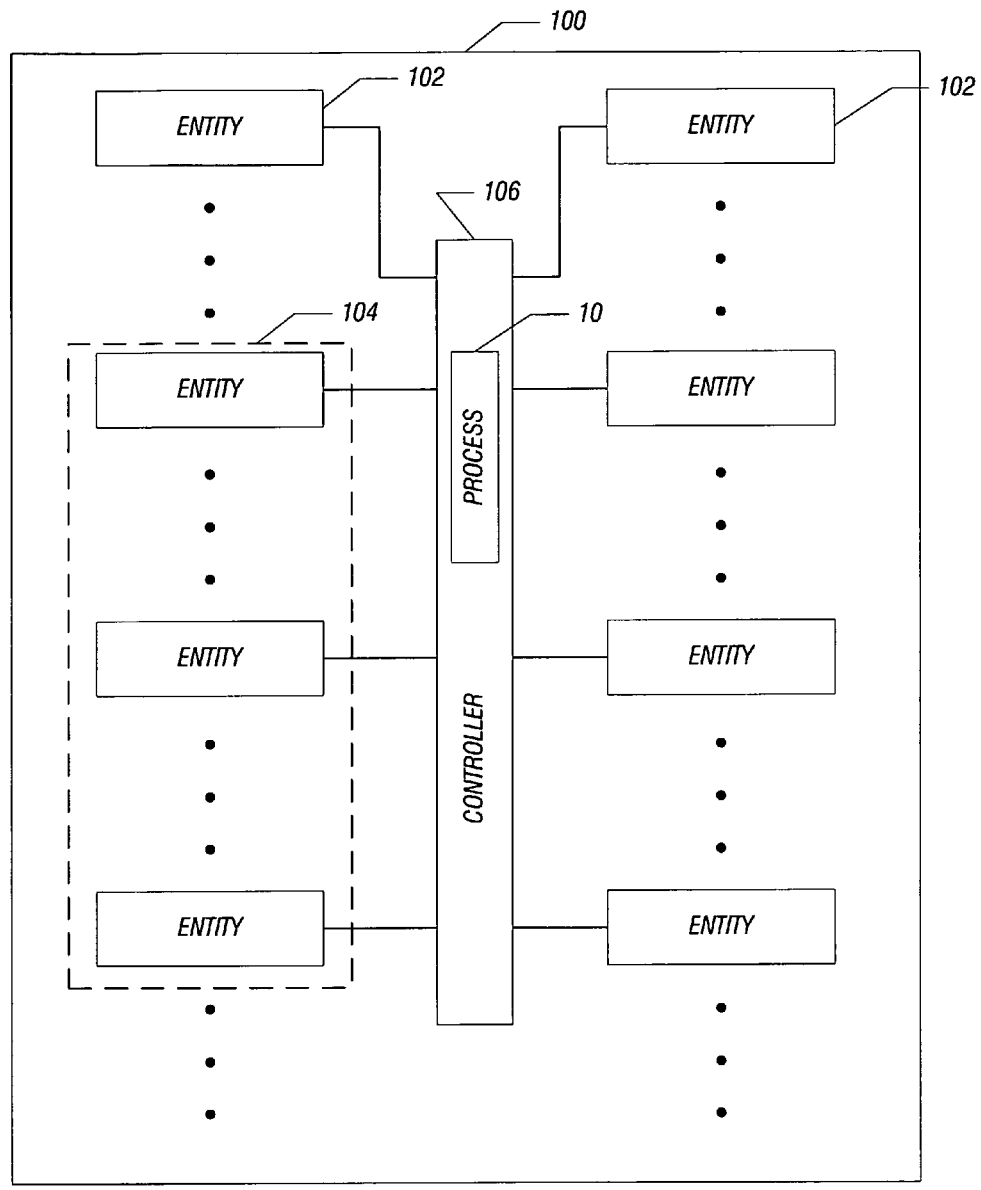
FIG. 1 is a schematic depiction of a semiconductor fabrication facility.

A hypothetical organization of a semiconductor fabrication facility 100 is illustrated in FIG. 1. It may include entities 102 which are semiconductor process or metrology tools capable of processing a lot. An entity is a semiconductor processor metrology tool capable of processing a lot. Entities with similar processing capabilities may be treated as a cluster and can be viewed as a collection of instances of an entity type.

Each entity 102 may be coupled to a controller 106. The controller 106 may be an automated data processing device such as a computer. It may be on-site at the fabrication facility 100, as shown, or may be off-site. The controller 100 communicates with each of the entities 102. This communication interface may be hard wired or wireless, to mention two examples.

A number of entities 102 that operate similarly or with similar capabilities may be grouped as a cluster 104. Thus, a number of entities 102 may be handled as a unit, in that at least some lots may be assigned to any of a variety of entities within the cluster 104.

The controller 106 includes a process 10. The process 10 may be incorporated into the controller 106 as software or firmware. Thus, code may be provided to the controller 106 to enable it to implement an assignment algorithm in one embodiment. The algorithm enables the controller 106 to assign lots of wafers to be processed to entities 102 available or reasonably assumed to be available to process those lots. The aim is to process the lots efficiently to improve the throughput of lots through the semiconductor fabrication facility 100.

At a high level, this assignment may utilize a number of principles. One principle is that the overall algorithm may be modular in that it may be applied to any given process area within the fabrication facility. However, some aspects of the algorithm may be customized to each process area. Thus, the same algorithm may be run in an implant area and a deposition area, but certain customization may be done to facilitate optimization based on specific constraints. Those constraints may include a variety of variables affected by the cost of the equipment, the speed of the equipment, the availability of the equipment, the sensitivity of the equipment, and an infinite number of other variables.

In this way, the management of the algorithm in each process area may be facilitated because the algorithm, as a whole, is common to each process area, even though it may be customizable for specific areas. This permits one who has general knowledge of the algorithm to maintain the algorithm for any specific process area.

In order to establish the algorithm, a series of steps may be undertaken in order to customize the algorithm as necessary for each process module. Initially, the owners of a process work area within the fabrication facility 100 work with factory operation managers to decide the functions that will go into a cost function. Basically, the cost function is associated with each entity within the process area. The cost function indicates how desirable it may be for a specific entity to process a particular lot. The considerations which go into the cost function may be a combination of different factors, such as overall cycle time of a lot, entity utilization, and the like. The cost function may be variable over time.

Next, the specification of state-independent and state-dependent constraints may be undertaken by the owners of the process work area, such as process engineers and operation managers. The process and operational constraints that should be imposed when doing the lot entity assignment may be better defined.

Next, the same experts may determine how to prioritize lots for assignment. For instance, one choice for sorting order may be high priority lots to be assigned first, followed by non-high priority lots in a first-in, first-out order. In the first-in, first-out order, the first "in" may refer to the time that a lot arrived at the process step.

Then, the maximum number of lots to be assigned to an entity at any given time may be determined. The assignment of lots to entities is advantageously not done too early in some embodiments. In case an entity goes down and is unable to process any more material, there may be a significant cost in moving all the assigned lots to another entity. Assigning lots to entities when the entity is free may be too late, since some time is needed to retrieve a lot from a stocker and to deliver it to an entity via an automated material handling system. Thus, there is a desirable number of lots queued for each entity type. The setting of the desired queue length for a given entity will be referred to herein as a "watermark."

A stocker is a device capable of housing many front opening unified pods. A front opening unified pod is a physical box that stores a lot. It may provide a sealed environment for wafers in the lot. It may be compatible with an automated transport via an automated material handling system. Thus, a stocker is a device that is capable of housing many front opening unified pods and is adaptable to a particular automated material handling system.

Once the customization is complete for a given module, that customization may be coded into automated logic. Thus, in some aspects the automated logic is customizable and in other aspects the automatic logic is the same from process module to process module.

Figure 2:
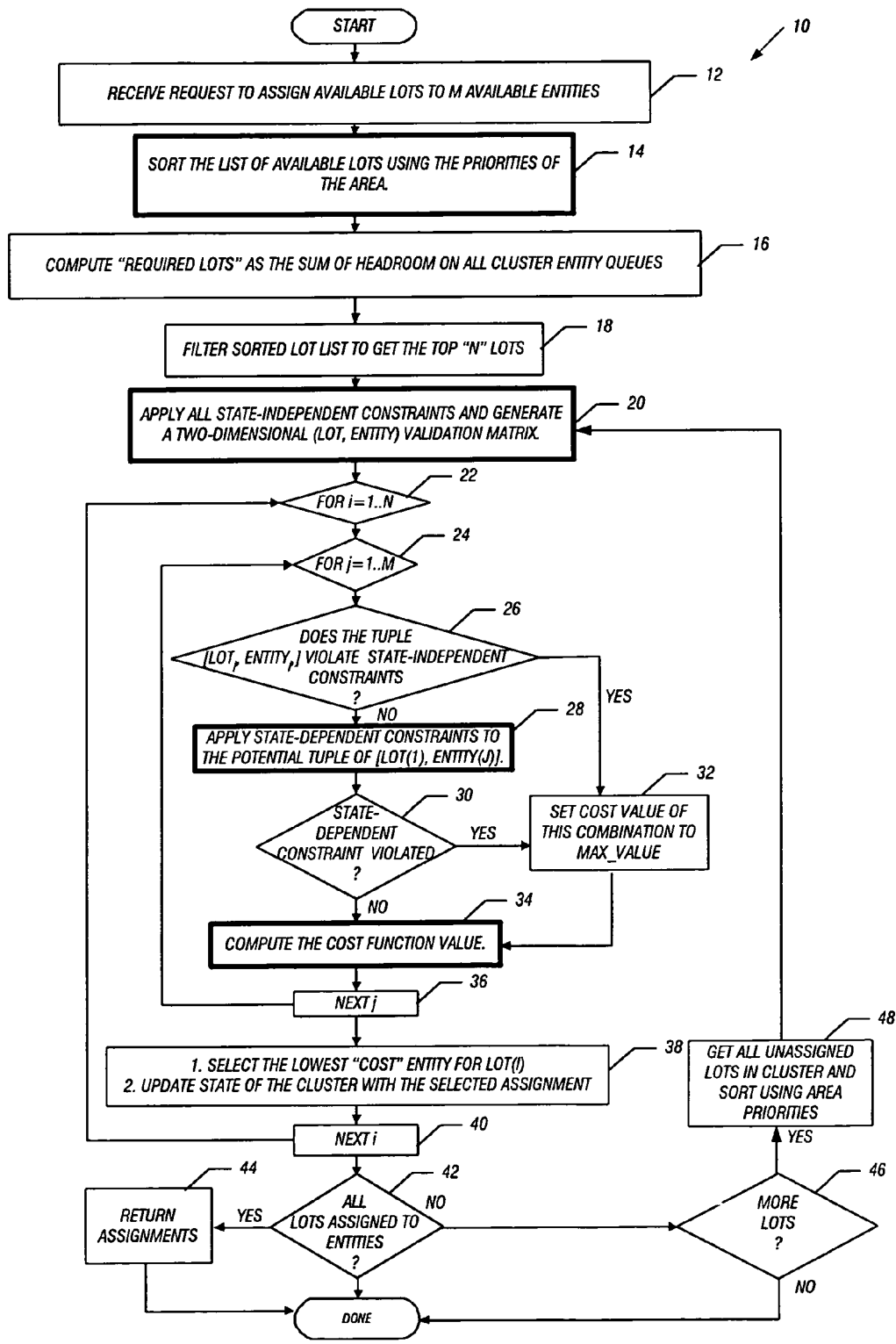
FIG. 2 is a process flow in accordance with one embodiment of the present invention.

Referring to FIG. 2, the operation of the algorithm 10, in one embodiment, begins by receiving a request to assign available lots to M available entities as indicated in block 12. Thus, for a given entity cluster, the system may be requested to assign the available lots to available entities. The number of entities may be equal to M.

Then, referring to block 14, the list of available lots may be sorted using the priorities of a process module or area. (Note that blocks in bold are customizable). For example, one sorting option may be to assign certain "hot lots" to the top priority and the rest of the lots may be sorted by time of arrival at a given entity or process step. Many other prioritization techniques may be utilized. The point is that within any given area, the way that the priorities are assigned may be customized. Thus, the Implant area may have a different priority scheme than another area. The algorithm is modular in the sense that it can be applied to each of these areas with customization.

Then, referring to block 16, the required lots are computed. This may be done as a sum of the head room in all the cluster entity queues. The head room is the difference between the number of lots that a given entity may queue (i.e., the watermark) minus the number of lots that are already queued. Thus, each entity has a given queue length. The required lots are determined as a sum of the available spaces within all the queues of a cluster of entities. Each entity may have a watermark which is its pre-ordained queue length. Thus, the sum of the watermark minus the actual queue length of physical lots present in the queue for a given entity determines the so-called required lots.

Then, in block 18, the lot list is sorted to get the top N lots. The way that the top N lots are determined, in one embodiment, is to look at what are the required lots and what are the number of hot lots for a given entity. Then, the top N lots are equal to the maximum of these two numbers. For example, if there are three required lots for a given entity and one hot lot, the top N lots may include three lots. If there are three required lots and four hot lots, then N is four.

Next, the state-independent constraints are applied. This, too, is a customizable step. Each process module may customize what are state-independent and state-dependent variables.

In FIG. 2, the state-independent constraints are processed prior to the state-dependent states. This enables determination of states so that when the state-dependent constraints are ready to be evaluated, they may accommodate for the states that have now been assigned.

Then, two iteration loops begin. A first loop goes from I=1 to N, which is the top lot iteration. It goes from the diamond 22 to the block 40. The next loop is for J=1 to M where, again, M is the number of available entities. Thus, the top N lots are processed first and then the rest of the lots are processed thereafter.

Within the loops, the first check at diamond 26 determines whether the potential assignment of lots and entities violates state-independent constraints. If no state-independent constraint is violated, the flow continues on to apply the state-dependent constraints. This may be done in block 28. A check at diamond 30 determines whether any state-dependent constraint is violated for any lot entity combination or assignment.

If any state-independent constraint is violated, as determined at diamond 26, or any state-dependent constraint is violated, as determined at diamond 30, the cost value of the combination may be set to a maximum cost value in block 32. In other words, the cost value is assigned to a particular entity to make that combination of lot and entity assignment undesirable.

Then, in block 34, the cost function value is calculated. This calculation may be customized on a process module area basis.

In block 38, the lowest cost entity is selected for assignment of a given lot, while ensuring that the cost is less than a maximum value, thereby completing, as to that combination, the lot to entity assignment process. Then, the cluster state is updated with the selected assignment, as also indicated in block 38. When all the lots have been processed, a check at diamond 42 determines whether all lots are assigned to entities. If so, the assignments are returned as indicated in block 44.

Otherwise, a check at diamond 46 determines if there are more lots in the cluster that have not yet been considered. If not, the flow ends. If so, the unassigned lots in the cluster are collected and sorted using area priorities (block 48).

In some embodiments of the present invention, the total cycle time for lots in a fabrication facility may be reduced with improved entity utilization. The method of automated lot-entity assignments may be advantageous in terms of more optimal decision making, while respecting process and operational constraints. These constraints may include process constraints such as those that prevent an entity from processing a lot due to a temporary process excursion on the entity. There may also be operational constraints that require a preferential assignment of a certain type of lot to a specific set of entities, for operational efficiency.

The optimal assignment may be achieved by searching through the space of possible lot/entity combinations to pick the lot/entity assignment that allows lots to get processed at a process step as quickly as possible. In general, the search may pick the assignment that minimizes the cost of a combination of factors, such as cycle time of the lot, load balancing across a set of entities, and other considerations in some embodiments.

In some embodiments of the present invention, the workload of operators may be reduced. An automated optimal lot/entity assignment frees technicians to focus on more value added tasks, such as dealing with entity anomalies or errors.

In some embodiments, the variability in lot-to-entity assignment strategies may be reduced across different process areas. The automatic assignment of lots for processing entities reduces the intervention by a human operator in many embodiments. This may reduce the variability in decision making since different operators may use different heuristics to determine lot/entity assignments. The reduction in variability in decision making may impact variability and production output of a process area in the fabrication facility, improving overall throughput in some cases.

In addition, the ability to impose fabrication facility-wide priorities in a centralized manner may be achieved in some embodiments. The automated lot/entity assignment may provide for customizable cost functions. These customized cost functions may be designed to also include factory-wide priorities. Thus, when a high level management decision is made to prioritize a particular product, that priority can be imposed across the factory and across all process areas.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   automatically assigning wafer lots to process module entities;
   customizing the assignment for a particular process module entity;
   applying a cost function value to each of a plurality of process module entities; and
   increasing the cost function value if a state-dependent or state-independent constraint would be violated by the assignment of lots to a particular process module entity.

2. The method of claim 1 including assigning a predetermined queue length to each of at least two process module entities.

3. The method of claim 2 including determining how many lots are assigned in a queue and the difference between the predetermined queue length and the number of lots assigned to the queue.

4. The method of claim 3 including assigning priorities to prioritized lots of a plurality of lots.

5. The method of claim 4 including determining a number of top lots including the maximum of the required lots and prioritized lots.

6. The method of claim 1 including applying both state-independent and state-dependent constraints to the assignment of lots to process module entities.

7. The method of claim 6 including applying a state-independent constraint before applying a state-dependent constraint.

8. The method of claim 1 including determining the cost function values for a plurality of lot-to-process module entity assignments and assigning a lot to an entity based on its cost function value.

9. A computer readable medium storing instructions that, if executed, enable a processor-based system to:
   automatically assign wafer lots to process module entities;
   customize the assignment for a particular process module entity;
   apply a cost function value to each of a plurality of process module entities; and
   increase the cost function value if a state-dependent or state-independent constraint would be violated by the assignment of lots to a particular process module entity.

10. The computer readable medium of claim 9 further storing instructions to assign a predetermined queue length to each of at least two process module entities.

11. The computer readable medium of claim 10 further storing instructions to determine how many lots are assigned in a queue and the difference between the predetermined queue length and the number of lots assigned to the queue.

12. The computer readable medium of claim 11 further storing instructions to assign priorities to prioritized lots of a plurality of lots.

13. The computer readable medium of claim 12 further storing instructions to determine a number of top lots including the maximum of the required lots and prioritized lots.

14. The computer readable medium of claim 9 further storing instructions to apply both state-independent and state-dependent constraints to the assignment of lots to process module entities.

15. The computer readable medium of claim 14 further storing instructions to apply a state-independent constraint before applying a state-dependent constraint.

16. The computer readable medium of claim 9 further storing instructions to determine the cost function values for a plurality of lot-to-process module entity assignments and assign a lot to an entity based on its cost function value.

17. A fabrication facility comprising:
   a plurality of entities; and
   a controller to automatically assign wafer lots to process module entities, customize the assignment of a particular process module entity, apply a cost function value to each of a plurality of process module entities, and increase the cost function value if a state-dependent or state-independent constraint would be violated by the assignment of lots to a particular process module entity.

18. The facility of claim 17 wherein said controller to assign a predetermined queue length to each of at least two process module entities.

19. The facility of claim 18 wherein said controller to determine how many lots are assigned in a queue and the difference between the predetermined queue length and the number of lots assigned to the queue.

20. The facility of claim 19 wherein said controller to assign priorities to prioritized lots of a plurality of lots.

21. The facility of claim 20 wherein said controller to determine a number of top lots including the maximum of the required lots and prioritized lots.

22. The facility of claim 17 wherein said controller to apply both state-independent and state-dependent constraints to the assignment of lots to process module entities.

23. The facility of claim 22 wherein said controller to apply a state-independent constraint before applying a state-dependent constraint.

24. The facility of claim 17 wherein said controller to determine the cost function values for a plurality of lot-to-process module entity assignments and assign a lot to an entity based on its cost function value.

* * * * *